(12) United States Patent
Yan (10) Patent No.: US 10,881,184 B1
(45) Date of Patent: Jan. 5, 2021

(54) CONTAINER FOR A STICK PRODUCT

(71) Applicant: ELC Management LLC, Melville, NY (US)

(72) Inventor: Jian Yan, Kirkland (CA)

(73) Assignee: ELC MANAGEMENT LLC, Melville, NY (US)

( * ) Notice: Subject to any disclaimer, the term of this patent is extended or adjusted under 35 U.S.C. 154(b) by 0 days.

(21) Appl. No.: 16/589,662

(22) Filed: Oct. 1, 2019

(51) Int. Cl.
*A45D 40/06* (2006.01)
*A45D 40/00* (2006.01)

(52) U.S. Cl.
CPC ...... *A45D 40/06* (2013.01); *A45D 2040/0043* (2013.01)

(58) Field of Classification Search
CPC .... A45D 2040/0025; A45D 2040/0031; A45D 2040/0043; A45D 2040/005; A45D 2040/0056; A45D 2040/204; A45D 2040/208; A45D 40/02; A45D 40/04; A45D 40/06; A45D 40/065; A45D 40/12; A45D 40/14; A45D 40/16; A45D 40/205; B43K 21/06; B43K 21/08; B43K 21/085; B43K 24/06; B43K 24/146; B43K 24/14
See application file for complete search history.

(56) References Cited

U.S. PATENT DOCUMENTS

| | | | | |
|---|---|---|---|---|
| 2,383,726 A | * | 8/1945 | Leshin | A45D 40/04 401/75 |
| 2,485,105 A | * | 10/1949 | McKnight | A45D 40/04 401/61 |
| 2,913,103 A | * | 11/1959 | Isele | A45D 40/06 401/78 |
| 2,921,675 A | * | 1/1960 | Clark | A45D 40/06 401/78 |
| 3,002,611 A | * | 10/1961 | Doblin | A45D 40/06 401/78 |
| 3,083,823 A | * | 4/1963 | Metreaud | A45D 40/06 401/78 |
| 3,335,854 A | * | 8/1967 | Landen | A45D 40/16 401/55 |
| 3,438,714 A | | 4/1969 | Seaver | |
| 3,623,822 A | * | 11/1971 | Davidson | A45D 40/06 401/78 |
| 3,758,218 A | * | 9/1973 | Pfrommer | A45D 40/06 401/86 |
| 4,505,607 A | * | 3/1985 | Sugiyama | A45D 40/06 401/78 |
| 4,738,559 A | * | 4/1988 | Gueret | A45D 40/06 401/68 |
| 5,399,040 A | * | 3/1995 | Holloway | A45D 40/06 401/78 |
| 5,605,408 A | * | 2/1997 | Su | A45D 40/06 401/78 |

(Continued)

*Primary Examiner* — Patrick M. Buechner
(74) *Attorney, Agent, or Firm* — Peter Giancana (57) ABSTRACT

A disposable cartridge assembly for stick products, intended to be used in conjunction with a rotating base member that unlocks the cartridge and raises and lowers the stick product in the assembly. The rotating base member is intended to remain connected to the cartridge assembly for the life of the stick product, but may be detached and reused with multiple cartridges, which can be sold for the purpose. This design creates various options for manufacture and assembly of the various components at one or more locations.

14 Claims, 7 Drawing Sheets

(56) References Cited

U.S. PATENT DOCUMENTS

| | | | |
|---|---|---|---|
| 5,636,930 A * | 6/1997 | Holloway | A45D 40/06 401/74 |
| 5,649,777 A * | 7/1997 | Holloway | A45D 40/06 401/74 |
| 5,984,552 A | 11/1999 | Ackermann et al. | |
| 5,988,917 A * | 11/1999 | Sheffler | A45D 40/06 401/68 |
| 9,113,693 B2 | 8/2015 | Yan | |
| 2018/0289130 A1* | 10/2018 | Xiong | A45D 40/02 |
| 2018/0295968 A1* | 10/2018 | Groffsky | A45D 40/04 |
| 2020/0060409 A1* | 2/2020 | Ok | A45D 33/24 |

* cited by examiner

CONTAINER FOR A STICK PRODUCT

FIELD OF THE INVENTION

The present invention relates to a container for housing a stick product, especially lipstick. More particularly, it relates to a disposable cartridge that allows a stick product in a holder cup to be moved between an advanced position, where the product within the holder cup is capable of being applied by a consumer, and a retracted position.

BACKGROUND

Prior art containers for stick products may include a cylinder that has a rotatable member disposed at its bottom end. The stick product is received into a holder cup, and the holder cup is disposed within the cylinder. Rotation of the rotatable member relative to the cylinder causes a mechanism inside the cylinder to advance the expendable mass longitudinally away from the rotating member such that a portion of the stick product becomes exposed above the cylinder. In this manner, the exposed portion of the product is available for application.

For example, a common type of container features an cam sleeve placed around a cylindrical inner body such that the cam and body can rotate with respect to each other. The inner body is hollow, and has a wall and at least one longitudinal slot that extends through the wall. The cam sleeve has an inner wall that features at least one helical slot that extends along a substantial length of the inner wall. A product holder cup is provided with at least one cam follower in the form of a lug. When the holder cup is fitted into the inner body, the lug extends through the longitudinal slot of the inner body to engage the helical slot of the cam sleeve. When the inner body and cam sleeve are rotated relative to each other, the helical slot applies pressure to the lug of the holder cup, which drives the holder cup up or down in the longitudinal slot, thereby moving the stick product between an advanced and a retracted position. A typical example of this type of device is described in U.S. Pat. No. 3,438,714.

In the simplest designs, once the cam sleeve is assembled over the inner body, the cam sleeve will prevent the top of the inner body from flexing outwardly, which means that the holder cup and product cannot be removed from the container for refilling or reusing the container. In some designs, the helical slot stops before reaching the top of the cam sleeve. This would also prevent the holder cup from being removed from the container. However, one refillable cosmetic container is disclosed in U.S. Pat. No. 2,913,103. As disclosed therein, the longitudinal and helical slots open up onto the top end of the inner body and cam sleeve, respectively. When the holder cup is in its fully advanced position, the opened top ends of the longitudinal and helical slots are registered with each other, and the lugs of the holder cup can pass through. In this configuration, a significant portion of the holder cup sits above the container, so that the holder cup may be grasped and lifted out of the top of the container, without contacting the stick product. Likewise, as long as the open top ends of the longitudinal and helical slots are registered with each other, the holder cup may be re-inserted through the top of the container. The helical slot prevents the holder cup from just dropping to the bottom of the longitudinal slot. Once the lug of the holder cup is positioned in the tops of the two slots, relative rotation of the cam sleeve and inner body will retract the holder cup and stick product into the container. In the same way, a new holder cup with the same or a different stick product may be inserted into the container. In this way, the container may be reused, again and again, with the same or a different product. The '103 patent also provides an intermediate stop position of the holder cup, at which the stick product can be used, but which prevents a person from accidentally ejecting the holder cup from the container by advancing the holder cup too far. The intermediate stop is implemented as a narrowing of the longitudinal slot which impedes the passage of the lug. This impedance can be overcome by forceful rotation of the cam sleeve relative to the inner body, but that would have to be intentional on the part of a user when she actually intended to eject the holder cup. Furthermore, the '103 patent also provides a similar narrowing of the longitudinal slot near the bottom of the longitudinal slot. Again, the lug can be forced through this narrow section by forceful rotation of the cam sleeve relative to the inner body. This would lock the holder cup in its fully retracted position, and prevent the holder cup from advancing accidentally, as through vibration. Again, this locking feature can be overcome by forceful rotation of the cam sleeve relative to the inner body.

U.S. Pat. Nos. 5,984,552 and 9,113,693 describe locking features that are intended to be engaged only once. In the locked position, the stick product cannot be raised above the container. But once unlocked, the device can be used normally, but cannot return easily to this locked position. In the '552 design, the locking feature is embodied in an extended portion at the bottom of the longitudinal slot. In the locked position, the lugs of the holder cup are prevented from moving out of the extended portion of the longitudinal slot by a narrow section of the slot. In this case, it would be difficult to force the lugs passed the narrow section by turning the inner body relative to the cam sleeve. However, a probe tool is described that enters into the an opening in the base of the container, and pushes against the holder cup. By this method, a user is able to apply enough force to push the lugs through the narrow section, and into the main section of the longitudinal slot. When the probe tool, which serves no other purpose, is removed from the base of the container, the holder cup can be raised in the usual manner. The probe tool may be reused with a different container of product.

In the '693 design, the bottom of the longitudinal slot again features an extended portion, but the '693 design also makes use of a lower horizontal retention region at bottom of the helical slot. In the locked position, the lugs of the holder cup sit in the lower horizontal region of the helical slot, such that any relative rotation of the cam sleeve and inner body fails to produce an axial movement of the holder cup. However, a hollow base is described. When the container is inserted into the hollow base, a probe tool enters into the an opening in the bottom of the container, and pushes against the holder cup. This raises the holder cup out of the lower horizontal region of the helical slot, and into the helical slot proper. At the same time, the hollow base links to the inner body, so that they can rotate as one. Thus, unlike the '552 patent, this hollow base with probe tool is intended to remain attached to the container, such that relative rotation of the cam sleeve and the hollow base raises the holder cup in the usual manner. If the hollow base is separated from the container, then the holder cup could be returned to a locked position with the lugs in the lower horizontal region of the helical slot. When the stick product is exhausted, the hollow base may be separated from the container, and reused with a new container of product.

Regarding assembly, it is often the case that the holder cup, with or without stick product, is inserted into the inner body through the top of the inner body such that the lug of the holder cup is positioned in the longitudinal slot of the inner body. Thereafter, the holder cup drops to the bottom of the longitudinal slot. Next, the cam sleeve is slid over the top of the inner body. To facilitate this assembly, the top of the inner body is usually designed to flex inwardly until the cam sleeve is fully seated on the inner body. If the product was pre-filled into the holder cup, then it is not uncommon for the inner body to contact the stick product and damage the product. This is the situation in the '714 and '552 patents described above. If the stick product was not pre-filled into the holder cup, then the filling process is complicated by the fact that the holder cup is sitting at the bottom of the container. This is the situation described in the '693 patent, but the '103 patent is different. In that disclosure, because the top ends of the longitudinal and helical slots open up on to the top of the inner body and cam sleeve, the holder cup is able to pass into and out of the container whenever the top ends of the two slots are registered with each other. This means that cam sleeve may be fitted over the inner body first, and then the holder cup can be inserted into the container, because no outward flexing of the inner body is required. When inserting the holder cup, the helical slot prevents the holder cup from just dropping to the bottom of the longitudinal slot. Once the lug of the holder cup is positioned in the tops of the two slots, relative rotation of the cam sleeve and inner body will retract the holder cup into the container. This also means that the stick product may be filled into the holder cup before the holder cup is positioned in the container, or it may be filled afterward, but with the holder cup in an elevated position. Either way, assembly of the components is achieved with less or no damage to the stick product.

OBJECTS OF THE INVENTION

A main object of the invention is to provide a container for a stick product that comprises a disposable cartridge that holds the stick product, and a reusable unlocking tool, especially where the unlocking tool is implemented an upscale fashion accessory.

SUMMARY

A container according to the present invention comprises a disposable cartridge, a reusable unlocking tool, and an overcap. The disposable cartridge is able to house a stick product, such as lipstick, lip balm, deodorant stick, antiperspirant stick, glue stick, etc. Unlike conventional containers for stick products, in the present invention the cam sleeve is applied over the inner body by sliding the cam sleeve up from the bottom of the inner body. The holder cup can be inserted into the inner body either before of after the cam sleeve is mounted to the inner body. This design creates various options for manufacture and assembly of the various components at one or more locations. The design also includes a locking feature that prevents the holder cup from moving within the inner body, to protect the stick product during transport. An unlocking tool in the form of a rotating base member is provided. The rotating base member is intended to remain connected to the disposable cartridge for the life of the stick product, but may be detached and reused, thereafter. In some preferred embodiments, the rotating base member is implemented as an upscale fashion accessory that adds style and beauty to the container assembly, and is intended to be reused with multiple cartridges, which can be sold for the purpose.

DETAILED DESCRIPTION

Figure 1:
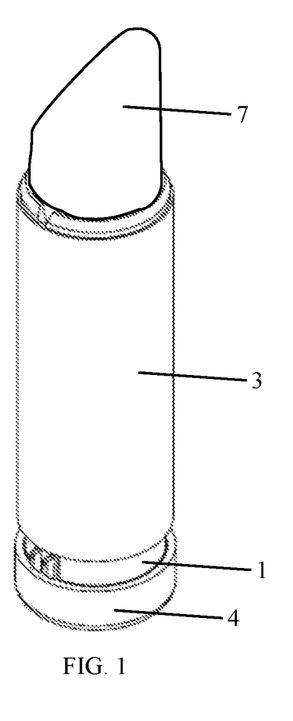
FIG. 1 depicts an assembled disposable cartridge and rotating base member, according to the present invention, with no stick product in the cartridge.
Figure 2:
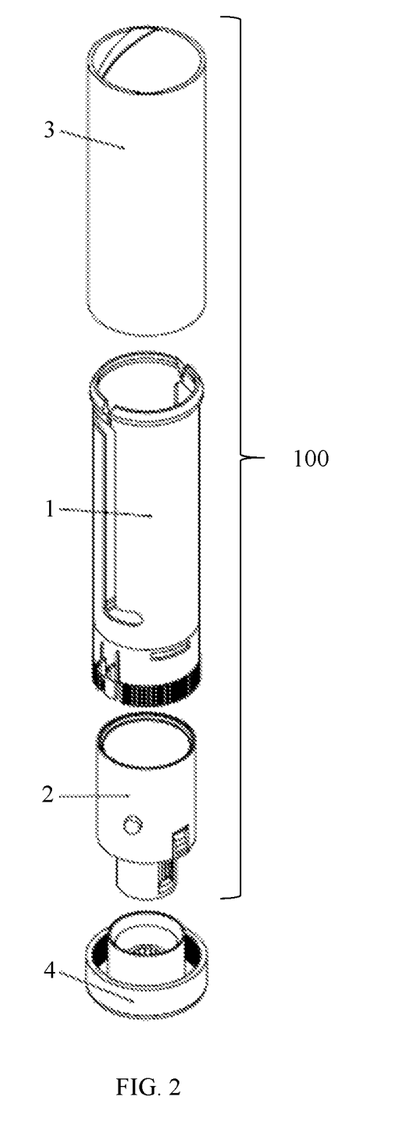
FIG. 2 is an exploded view of the device of FIG. 1.

Referring to FIGS. 1 and 2, a container for a stick product according to the present invention comprises a disposable cartridge (100) and a rotating base member (4). The disposable cartridge comprises an inner body (1), a holder cup (2) that is able to hold a stick product, and a cam sleeve (3).

Inner Body

Figure 3:
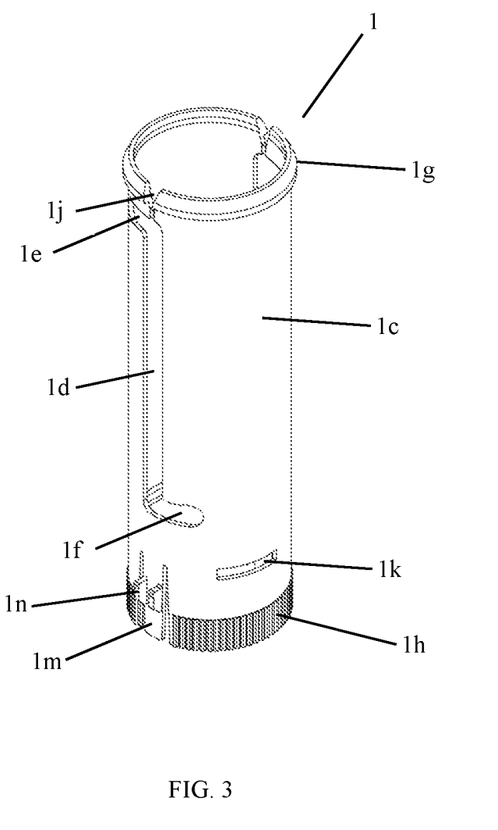
FIG. 3 is a perspective view of one embodiment of an inner body.
Figure 4:
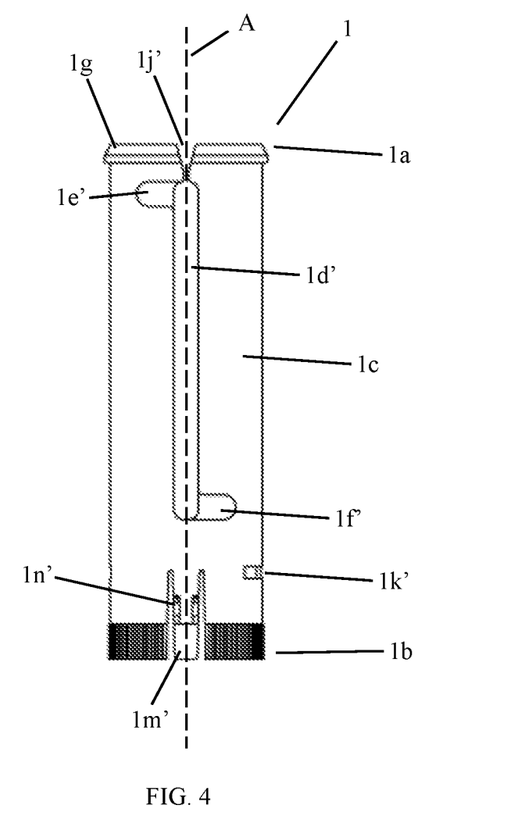
FIG. 4 is an elevation view showing the opposite side of the inner body of FIG. 3.

Referring to FIGS. 3 and 4, the inner body (1) is a generally cylindrical member that has an opened top (1a) and an opened bottom (1b) separated by a side wall (1c). The central, longitudinal axis (A) of the inner body is shown in FIG. 4.

Figure 5:
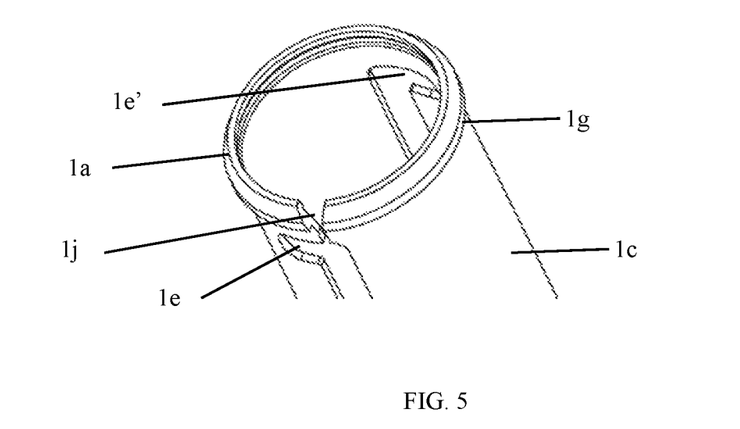
FIG. 5 shows the top portion of an alternate embodiment of an inner body.

Two longitudinal tracks (1d, 1d'), positioned 180° apart, pass through the side wall. Each longitudinal track extends between an upper horizontal track (1e, 1e') at its upper end, and a lower horizontal track (1f, 1f') at its lower end. One or both of the upper horizontal tracks intersects with a notch that opens up onto the top of the inner body. In FIGS. 3 and 4, both horizontal tracks intersect with a notch (1j, 1j') that opens up onto the top (1a) of the inner body (1). Alternatively, in FIG. 5, only one of the upper horizontal tracks (1e) intersects with a notch (1j) that opens up onto the top (1a) of the inner body (1). The other upper horizontal track (1e') does not open up onto the top of the inner body. In either embodiment, the side wall (1c) has some flexibility, such that the opening at the top (1a) of the inner body can be temporarily enlarged, and then allowed to return to its original size.

Preferably, the top of the inner body (1) is formed with a rim (1g) that overhangs the side wall (1c). Preferably, the side wall (1c) comprises vertical tabs (1m, 1m'), positioned below each lower horizontal track (1f, 1f'). Each vertical tab is flexible in a radial direction. Each tab has at least one protrusion (1n, 1n') that extends outward.

The side wall (1c) comprises two horizontal slots (1k, 1k') positioned below the level of the lower horizontal tracks (1f, 1f'), but above the level of the protrusions (1n, 1n'), if present, as shown in FIG. 3.

The side wall (1c) also comprises vertical grooves (1h) located on the exterior of the side wall, near the bottom (1b) of the inner body (1).

Holder Cup

Figure 6:
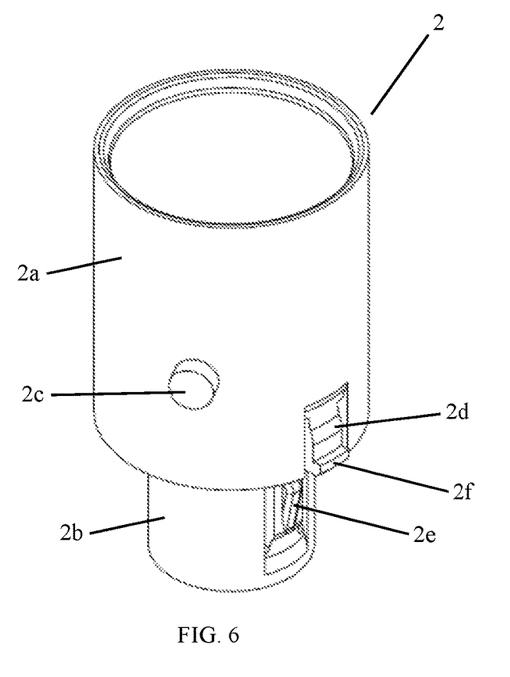
FIG. 6 is a perspective view of a holder cup for a stick product.
Figure 7:
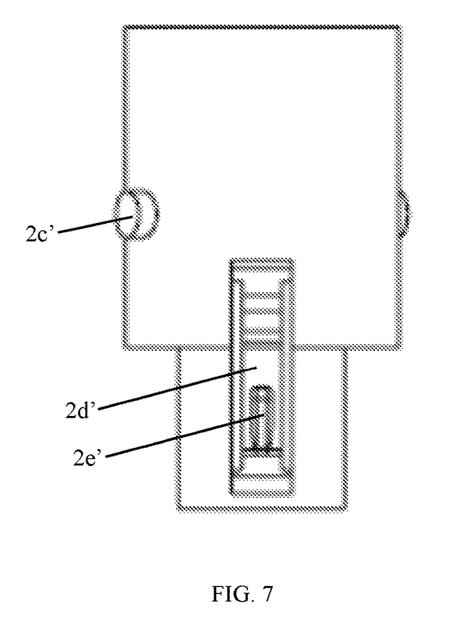
FIG. 7 is an elevation view of the holder cup of FIG. 6.
Figure 8:
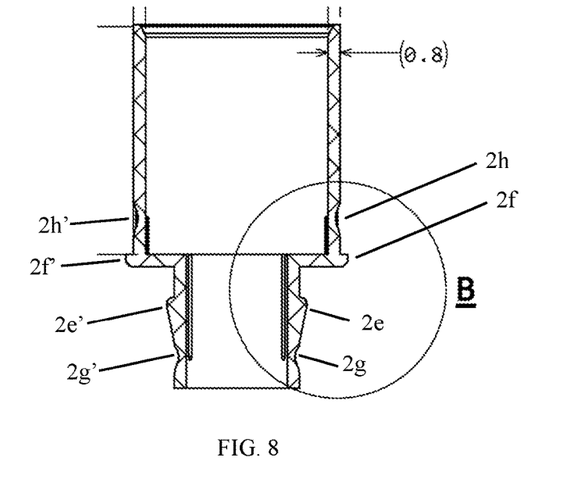
FIG. 8 is a cross sectional view of a holder cup.

A holder cup (2) is shown in FIGS. 6-8. The holder cup comprises an upper cylindrical body (2a), attached in a concentric fashion to a lower cylindrical body (2b). The upper and lower cylindrical bodies are hollow. The upper cylindrical body is able to receive and retain a solid or semi solid stick product, such as a lipstick, lip balm, deodorant stick, anti-perspirant stick, glue stick, etc. The stick is generally retained in the holder cup by friction, but additional means may be provided as known in the art. The outer surface of the upper cylindrical body (2a) is provided with a pair of opposing lugs (2c, 2c'). The holder cup (2) fits inside the inner body (1), and can be inserted into the inner body through the top opening (1a) thereof. Regardless of whether the inner body has one or two notches (1j, 1j'), as described above, the flexibility of the side wall (1c) of the inner body allows the opening at the top (1a) to be enlarged an amount sufficient to allow each opposing lug to be inserted into one of the upper horizontal tracks (1e, 1e'). When the case is fully assembled, the lugs will be able to travel along the longitudinal tracks (1d, 1d') and horizontal tracks (1e, 1e', 1f, 1f) of the inner body. The lugs are long enough to extend through and beyond the longitudinal and horizontal tracks (1d, 1d') of the inner body (1).

Figure 9:
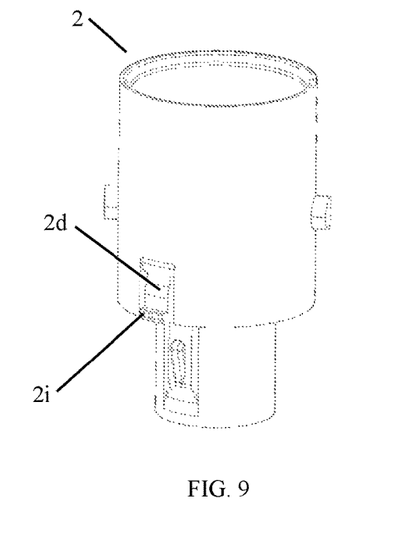
FIG. 9 is a close up of one embodiment of a holder cup.

The disposable cartridge (100) has a locked configuration in which the holder cup is locked, meaning that it cannot be raised or lowered by a relative rotation of the inner body (1) and cam sleeve (3). One type of locking feature is shown in FIGS. 6-9, where a section of the holder cup (2) that spans the upper and lower cylindrical bodies (2a, 2b) has been removed, and a flexible structure has been provided in that space. Actually, two such flexible structures (2d, 2d') are provided, 180° apart. The top and bottom of each flexible structure are attached to the holder cup to form upper and lower hinges, respectively. As a result, each flexible structure is able to be deflected a short distance in a radial direction. Referring to FIG. 8, the flexible structures have lower protrusions (2e, 2e') that extend outward from the lower cylindrical body (2b), and upper protrusions (2f, 2f) that extend outward from the upper cylindrical body (2a). In one assembled configuration (the "locked" configuration), the upper protrusions rest in the horizontal slots (1k, 1k') of the inner body (1). This configuration is achieved when the lugs (2c, 2c') of the holder cup are located in the lower horizontal tracks (1f, 1f') of the inner body (1). To remove the upper protrusions from the horizontal slots, inward pressure must be applied to the lower protrusions. This causes the lower protrusions to deflect inward, rotating around the lower hinges (2g, 2g'), and the upper protrusions will also deflect inward, rotating around the upper hinges (2h, 2h'). When the pressure is released from the lower protrusions, then the flexible structures will return to their original positions. During normal use, the upper protrusions (2f, 2f) slide along the inner wall of the inner body (1). Optionally, In order to alleviate the force of friction, the upper protrusions may be supplied with vertical ribs (2i), as seen in FIG. 9, to reduce the degree of contact between the two surfaces.

Cam Sleeve

Figures 10, 11:
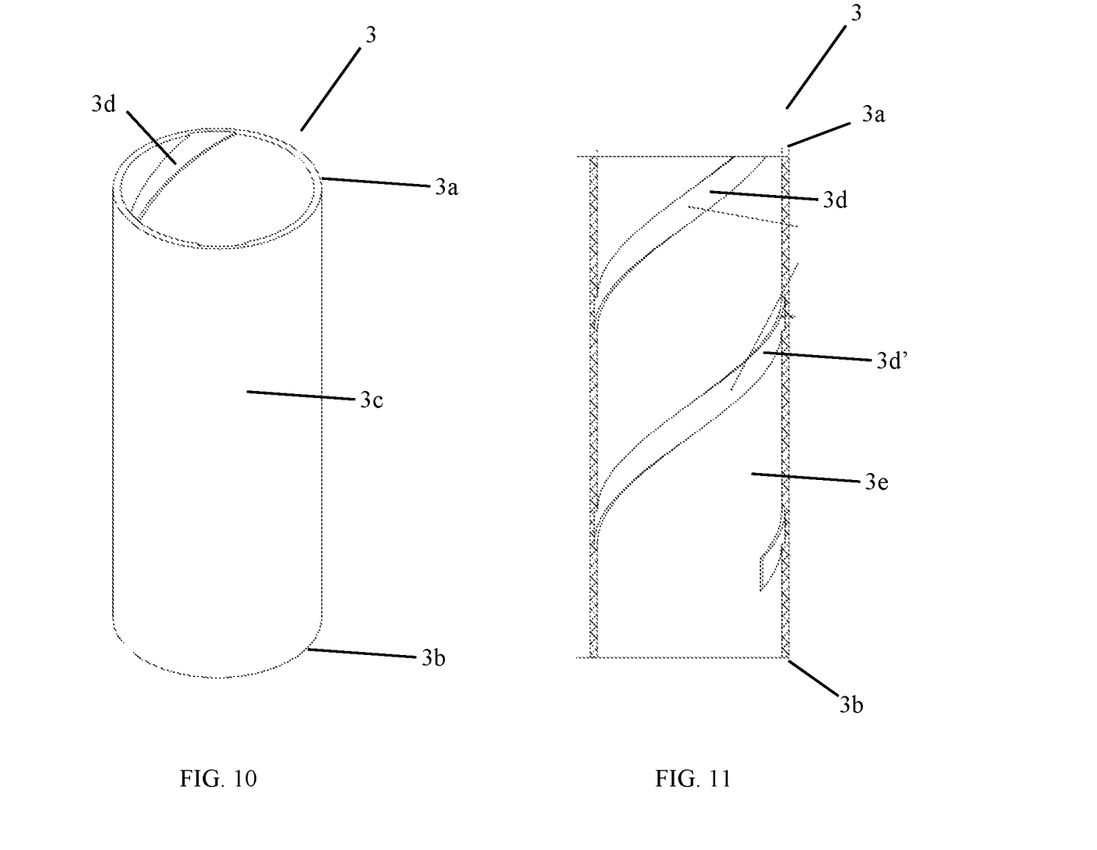
FIG. 10 is a perspective view of one embodiment of an cam sleeve.
FIG. 11 is a cross sectional view of the cam sleeve of FIG. 10.

A cam sleeve (3) is shown in FIGS. 10 and 11. The cam sleeve comprises a generally cylindrical body that has an opened top (3a) and an opened bottom (3b) separated by a side wall (3c). The side wall is generally solid. The interior surface (3e) of the side wall is provided with two essentially identical spiral tracks (3d, 3d'). Each track starts at the top (3a) of the cam sleeve and completes approximately one revolution to end above the bottom (3b) of the cam sleeve. The starting points of the two spiral tracks are spaced 180° apart, and likewise, the ending points. The cam sleeve fits over the inner body (1) in such a way that the pair of opposing lugs (2c, 2c') of the holder cup (2) are located in and travel in the spiral tracks (3d, 3d') when assembled.

Figure 15:
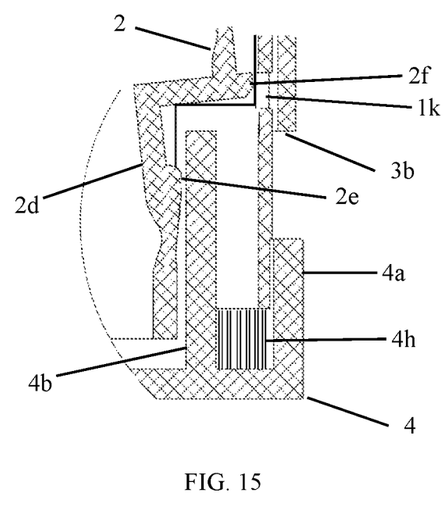
FIG. 15 is a cross sectional, close-up view of a locking mechanism wherein the holder cup has been unlocked by the rotating base member.

The cam sleeve (3) is designed slide over the inner body (1) in a concentric fashion. More specifically, the cam sleeve is mounted to the outside of the inner body by inserting the bottom (1b) of the inner body is into the top (3a) of the cam sleeve. When fully seated on the inner body, the cam sleeve and inner body are concentric, and the cam sleeve is trapped between the protrusions (1n, 1n') of the inner body, and the rim (1g) that overhangs the side wall (1c) at the top (1a) of the inner body (see FIG. 1). The cam sleeve will substantially fill that space, so that very little vertical movement of the cam sleeve with respect to the inner body is possible, however, the cam sleeve and inner body can rotate with respect to one another. By design, the cam sleeve extends over and hides the horizontal slots (1k, 1k') of the inner body. This blocks access to the upper protrusions (2f, 2f) of the holder cup (2), as shown in FIG. 15.

The assembled inner body (1), holder cup (2) and cam sleeve (3) constitute the disposable cartridge (100).

Rotating Base Member

Figure 12:
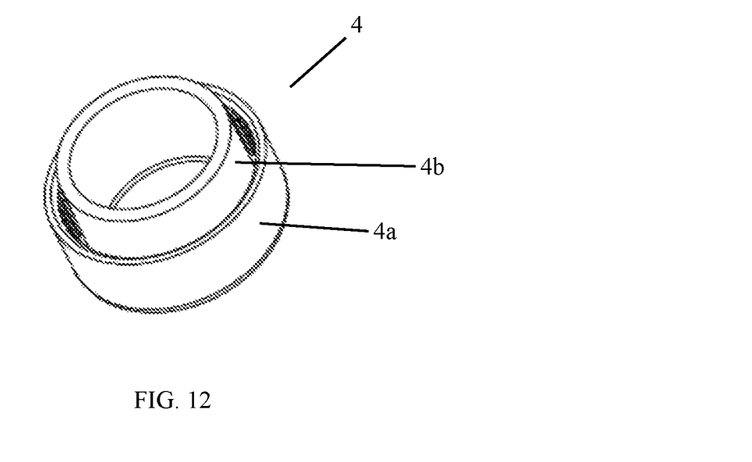
FIG. 12 is a perspective view of one embodiment of a rotating base member.
Figure 13:
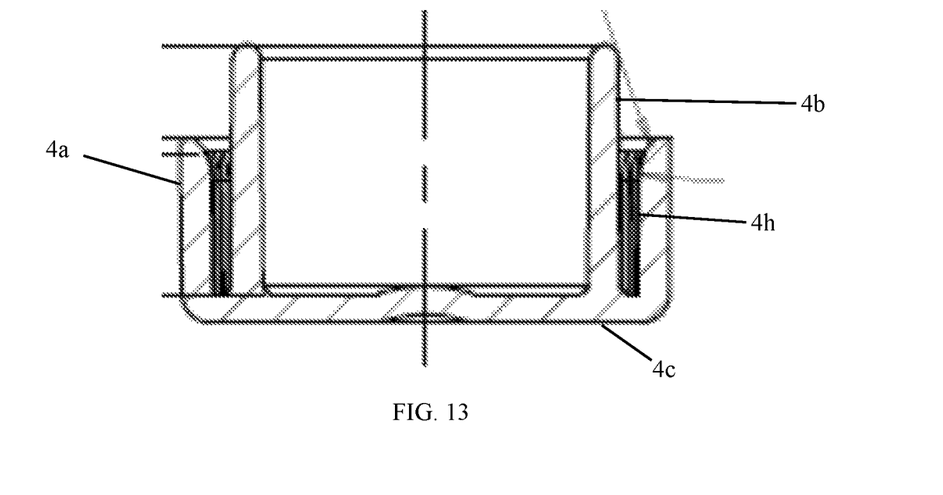
FIG. 13 is a cross sectional view of the rotating base member of FIG. 12.

As noted above, in the locked configuration the upper protrusions (2f, 2f) of the holder cup (2) rest in the horizontal slots (1k, 1k') of the inner body (1). An unlocking tool in the form of a reusable rotating base member is provided. One embodiment of a reusable rotating base member (4) is shown in FIGS. 12 and 13. An outer ring (4a) and an inner ring (4b) are concentric, and rise from a bottom surface (4c). Both rings are opened at the top. The rotating base member is designed to fit onto the bottom of the disposable cartridge (100) in a removable fashion. The bottom (1b) of the inner body (1) is able to slide into and out of the outer ring (4a) of the rotating base member. Also, the inner surface of the outer ring (4a) features vertical grooves (4h) that are designed to engage the vertical grooves (1h) on the exterior surface of the inner body (1). The nature of the engagement is such that rotation of the base member with respect to the cam sleeve (3) will result in rotation of the inner body with respect to the cam sleeve. By this action, the holder cup (2) is raised and lowered. The rotating base member may remain connected to the disposable cartridge for the life of the stick product, or may be easily detached, especially for reuse with a different disposable cartridge. The rotating base member may be detached from the disposable cartridge, by simply sliding the rotating base member off of the reusable cartridge.

Figure 14:
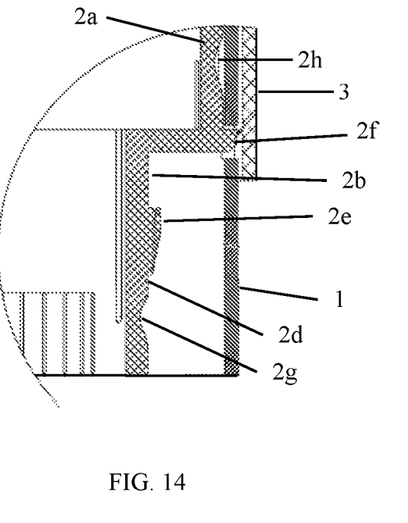
FIG. 14 is a cross sectional, close-up view of a locking mechanism with the holder cup in the locked position.

As will now be described, the upper protrusions of the holder cup are removed from the horizontal slots (1k, 1k') of the inner body by sliding the rotating base member on to the bottom of the disposable cartridge. Referring to FIGS. 14 and 15, the inner ring (4b) of the rotating base member (4) is sized to receive the lower cylindrical body (2b) of the holder cup (2). That is, the outer diameter of the lower cylindrical body is a little smaller than the inner diameter of the inner ring. However, the inner diameter of the inner ring is such that when the lower cylindrical body is inserted far enough into the inner ring, then the inner ring will engage the lower protrusions (2e, 2e') of the flexible structures (2d, 2d') of the holder cup (2), causing them to deflect inward (see FIG. 15). As a result, the upper protrusions (2f, 2f') of the flexible structures will also deflect inward, and come out of the horizontal slots (1k, 1k') of the inner body (1). In that configuration, rotating the base member (4) with respect to the cam sleeve (3) will cause the holder cup (2) to be raised and lowered with respect to the inner body (1).

The outer ring (4a) of the rotating base member may be relatively short such that the outer ring does not reach to the bottom (3b) of the cam sleeve (3), as shown in FIGS. 1, 14 and 15. Alternatively, the outer ring may be relatively taller, so that it covers a substantial portion of the cam sleeve. For example, the outer ring may cover at least 25% of the cam sleeve, or at least 50% of the cam sleeve, or at least 75% of the cam sleeve. The only restriction is that some portion of the cam sleeve protrudes out of the rotating base member, which is required to effect a relative rotation and raise/lower the holder cup. The remaining, exposed portion of the cam sleeve may be covered by an overcap (5). The overcap slides onto the cam sleeve from the top (3a) of the cam sleeve, which effectively shields the stick product (7) from the ambient environment.

Figure 16:
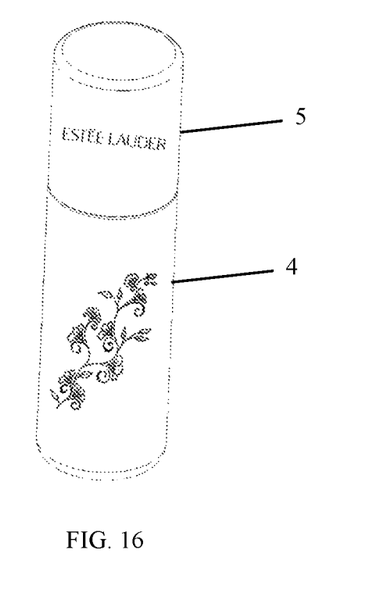
FIG. 16 is a second embodiment of a rotating base member cooperating with an overcap.

The rotating base member (4) may be inexpensive plastic component, having a plain or utilitarian appearance. However, in preferred embodiments, the rotating base member may be implemented as a reusable, upscale fashion accessory that adds style and beauty to the disposable cartridge (100). In this case, it is preferable if the outer ring (4a) of the rotating base member is tall enough to cover an appreciable portion of the cam sleeve (3) with the restriction noted above. When the rotating base member is implemented as an upscale fashion accessory, new fashion and marketing opportunities present themselves. The rotating base member could have a substantial weight to give it durability and the feel of a luxury item. There would be no limit to the surface features that the rotating base member could have. Preferably, the overcap (5) will match the upscale design of the rotating base member. Preferably, when placed on the cam sleeve, the overcap would meet the rotating base member (4) to completely cover the disposable cartridge (as in FIG. 16). When the disposable cartridge is exhausted (or simply when desired), a new cartridge having the same or a different stick product can be inserted into the rotating base member, and closed off with the overcap. Disposable product cartridges could be sold for that purpose.

Containers according to the present invention may be useful for all types of stick products that are applied to a surface by drawing the product across a surface. These include lipsticks, lip balms, deodorant sticks, anti-perspirant sticks, glue sticks, etc. For purposes of the present invention, a stick product is an elongated mass of solid or semi-solid product that is able to support its own weight when the elongated mass is suspended by one end.

Assembly Method 1

Figure 17:
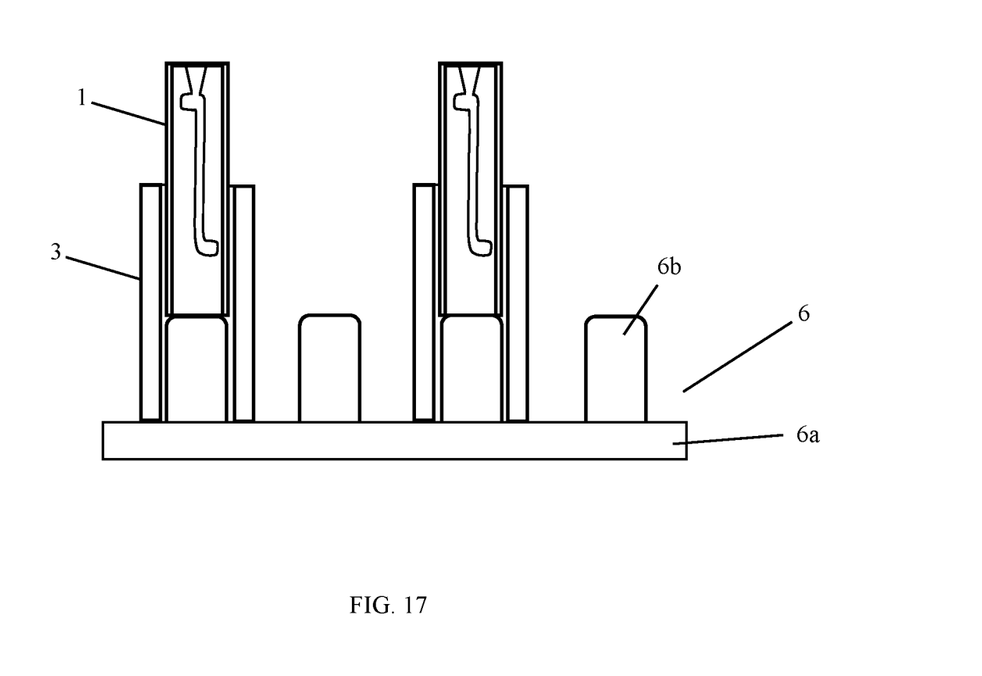
FIG. 17 is a cross sectional view of a cam sleeve and inner body mounted on a tray to hold the inner body in an elevated position with respect to the cam sleeve.

The inner body (1) is placed into the cam sleeve (3) through the opened top (3a) of the cam sleeve. The top (1a) of the inner body is made to sit well above the top (3a) of the cam sleeve. In this configuration, the top (1a) of the inner body will still be able to flex, to accommodate the insertion of a holder cup (2). The inner body and cam sleeve can be held in this configuration by an appliance designed for the purpose. For example, FIG. 17 shows an assembly tray (6) that comprises a base (6a) and one or more stacks (6b). The stacks are designed to fit into the cam sleeve, but not into the inner body. When a sub-assembly of the cam sleeve and inner body are placed onto a stack, the inner body will sit high with respect to the cam sleeve. The assembly tray may have any number of stacks to accommodate as many sub-assemblies. The assembly tray may be useful when sub-assemblies comprising inner bodies and cam sleeves will be assembled at one location, and the holder cup is to be assembled at another location. By using an assembly tray, the inner bodies will already be sitting high with respect to the cam sleeves, so that the tops of the inner bodies will still be able to flex to accommodate the insertion of the holder cups into the inner bodies. The holder cups, with or without a solid stick product, will be inserted through the tops (1a) of the inner bodies such that the opposing lugs (2c, 2c') of the holder cup enter into the upper horizontal tracks (1e, 1e') of the inner bodies.

Assembly Method 1A

When a stick product is to be inserted into the holder cup (2) prior to assembling the holder cup into the inner body (1), this may happen in a number of different ways. For example, a stick product (7) may be filled into a holder cup by pouring molten product into a mold cavity that has a holder cup situated at the bottom of the cavity. After the product is sufficiently hardened, the cup with product can be released from the mold. Alternatively, molten product may be poured into a mold cavity, and allowed to harden. Subsequently, the solid stick can be inserted into a holder cup. Either way, the holder cup with solid stick product, is then inserted through the top (1a) of the inner body, as described above.

Assembly Method 1B

When a stick product is to be inserted into the holder cup (2) after assembling the holder cup into the inner body (1), then the holder cup (2) without stick product is first inserted into the top (1a) of the inner body, as described above. Thereafter, while the inner body is still sitting high relative to the cam sleeve (3), a solid stick product (7) may inserted into the holder cup.

With either assembly method 1A or 1B, once the opposing lugs (2c, 2c') of the holder cup (2) are situated in the upper horizontal tracks (1e, 1e') of the inner body (1), the assembly may be removed from the tray (6), at which time, the inner body may be further inserted into the cam sleeve (3), until the bottom (3b) of the cam sleeve passes over the protrusions (1n, 1n') of the inner body. The protrusions of the inner body are designed to deflect inward to allow the cam sleeve to pass over, but once the cam sleeve has passed over, the protrusions snap back to prevent the cam sleeve from sliding down on the inner body. At this point, the cam sleeve is trapped in between the protrusions (1n, 1n') and the rim (1g) that overhangs the side wall (1c) at the top (1a) of the inner body (see FIG. 1). Initially, the opposing lugs (2c, 2c') may not be sitting in the spiral tracks (3d, 3d') of the cam sleeve, but by twisting of the cam sleeve relative to the inner body, the lugs will eventually be forced into the spiral tracks. From there, the holder cup can be retracted until the opposing lugs rest in the lower horizontal tracks (1f, 1f) of the inner body. At the same time, the upper protrusions (2f, 2f) of the holder cup come to rest in the horizontal slots (1k, 1k') of the inner body (1). This can be seen in FIGS. 14 and 15. In this configuration, the relative rotation of the cam sleeve and the inner body will not raise the holder cup, because the upper protrusions of the holder cup are trapped in the lower horizontal tracks of the inner body. An optional overcap, either a finished overcap (5) as described above, or a temporary overcap for shipping purposes, may be placed over the top opened end (3a) of the cam sleeve to protect the stick product. The assembled item is ready for distribution.

Use

When it is desired to use the stick product, the overcap (5) is removed. The inner ring (4b) of the rotating base member (4) is inserted into the opened bottom end (1b) of the inner body (1). The inner ring comes to bear against the lower protrusions (2e, 2e') that extend outward from the lower cylindrical body (2b) of the holder cup. By this pressure, the lower protrusions will deflect inward, rotating around the lower hinges (2g, 2g'), and the upper protrusions (2f, 2f) of the holder cup will also deflect inward, and come out of the horizontal slots (1k, 1k') of the inner body (1). If the rotating base member is then rotated relative to the cam sleeve, then the holder cup will elevate, and the stick product (7) can be exposed for use. This happened because the vertical grooves (4h) that are located on the inner surface of the outer ring (4a) of the rotating base member mesh with the vertical grooves (1h) on the exterior surface of the inner body (1) to form cooperating gears. Rotation of the base member with respect to the cam sleeve will result in rotation of the inner body with respect to the cam sleeve, and by this action, the holder cup is raised and lowered. The rotating base member may remain connected to the disposable cartridge (100) for the life of the stick product, so that the container is always ready to use. As long as the rotating base member is connected to the disposable cartridge, the upper protrusions (2f, 2f) of the holder cup will not be able to reenter the horizontal slots (1k, 1k') of the inner body (1), so that the container is always ready for use. When the stick product is exhausted, the disposable cartridge simply slides out of the rotating base member, and is discarded. The rotating base member can be slid onto a fresh cartridge which is then ready for use.

What is claimed is:

1. A container for a stick product that comprises:
   a disposable cartridge (100) that comprises:
     a cylindrical inner body (1) that has:
       an opened top (1a),
       an opened bottom (1b),
       a side wall (1c) having an exterior,
       two longitudinal tracks (1d, 1d') that pass through the side wall, and
       vertical grooves (1h) located on the exterior of the side wall, near the bottom of the inner body;
     a cylindrical cam sleeve (3) that has:
       an opened top (3a),
       an opened bottom (3b), and
       a side wall (3c) that has two spiral tracks (3d, 3d') located on an interior surface of the side wall,
       wherein, the cam sleeve is mounted to an outside of the inner body (1) in a concentric fashion; and
     a holder cup (2) that is able to receive and retain a stick product, the holder cup being located in the inner body, and having:
       a pair of lugs (2c, 2c') located on an outer surface of the holder cup, such that the lugs extend through the longitudinal tracks (1d, 1d') of the inner body and into the spiral tracks (3d, 3d') of the cam sleeve (3); and
   a reusable rotating base member (4) that is designed to fit onto the bottom of the disposable cartridge (100) in a removable fashion, and comprises:
     an inner ring (4a),
     an outer ring (4b) that is concentric with the inner ring, and
     vertical grooves (4h) located on an inner surface of the outer ring (4a), wherein:
       when the bottom (1b) of the inner body (1) is fitted into the outer ring of the rotating base member, then the vertical grooves (4h) of the rotating base member (4) engage the vertical grooves (1h) of the inner body (1), such that rotation of the base member (4) with respect to the cam sleeve (3) will raise and lower the holder cup (2) relative to the inner body (1); and
       the rotating base member (4) may be detached from the disposable cartridge (100) by sliding the rotating base member off of the disposable cartridge.

2. The container of claim 1 wherein the two longitudinal tracks (1d, 1d') are positioned 180° apart, and each longitudinal track extends between an upper horizontal track (1e, 1e') at its upper end, and a lower horizontal track (1f, 1f') at its lower end, and one or both of the upper horizontal tracks intersect with a notch (1j, 1j') that opens up onto the top (1a) of the inner body (1).

3. The container of claim 2 wherein the side wall (1c) further comprises two horizontal slots (1k, 1k') positioned below the level of the lower horizontal tracks (1f, 1f').

4. The container of claim 3 wherein each spiral track (3d, 3d') of the cam sleeve (3) starts at the top (3a) of the cam sleeve and completes approximately one revolution to end above the bottom (3b) of the cam sleeve, and the starting points of the two spiral tracks are spaced 180° apart.

5. The container of claim 3 wherein the top (1a) of the inner body (1) is formed with a rim (1g) that overhangs the side wall (1c), and the side wall comprises vertical tabs (1m, 1m') positioned below each lower horizontal track (1f, 1f'), such that the vertical tabs are flexible in a radial direction, and each tab has at least one protrusion (1n, 1n') that extends outwardly.

6. The container of claim 5 wherein the cam sleeve (3) is positioned between at least one protrusion (1n, 1n') and the rim (1g) of the inner body (1), such that the cam sleeve extends over the horizontal slots (1k, 1k') of the inner body.

7. The container of claim 6 wherein the holder cup (2) further comprises an upper cylindrical body (2a), attached in a concentric fashion to a lower cylindrical body (2b), wherein the upper and lower cylindrical bodies are hollow, and the upper cylindrical body is able to receive and retain the stick product.

8. The container of claim 7 wherein the disposable cartridge (100) has a locked configuration in which the holder cup (2) is locked, so that it cannot be raised or lowered by a relative rotation of the inner body (1) and cam sleeve (3).

9. The container of claim 8 wherein the locked configuration is achieved when the lugs (2c, 2c') of the holder cup (2) are located in the lower horizontal tracks (1f, 1f) of the inner body (1), and the rotating base member (4) is not attached to the disposable cartridge (100).

10. The container of claim 8 wherein holder cup (2) can be unlocked by sliding the rotating base member (4) onto the bottom of the disposable cartridge (100).

11. The container of claim 10 wherein the outer ring (4a) of the rotating base member (4) covers at least 25% of the cam sleeve (3), and the remaining exposed portion of the cam sleeve is covered by an overcap (5).

12. A method of assembling a container according to claim 2 comprising the steps of:

(a) placing the inner body (1) into the cam sleeve (3) through the opened top (3*a*) of the cam sleeve, such that the opened top (1*a*) of the inner body sits above the top of the cam sleeve;
(b) inserting the holder cup (2) through the opened top (1*a*) of the inner body (1) such that the opposing lugs (2*c*, 2*c'*) of the holder cup enter into the upper horizontal tracks (1*e*, 1*e'*) of the inner body;
(c) further inserting the inner body (1) into the cam sleeve (3);
(d) twisting the cam sleeve (3) relative to the inner body (1) until the opposing lugs (2*c*, 2*c'*) are forced into the spiral tracks (3*d*, 3*d'*) of the cam sleeve, and
(e) further twisting the cam sleeve (3) relative to the inner body (1) until the opposing lugs (2*c*, 2*c'*) rest in the lower horizontal tracks (1*f*, 1*f*) of the inner body.

13. The method of claim 12 wherein, after step (b), while the inner body (1) is still sitting high relative to the cam sleeve (3), a stick product (7) is inserted into the holder cup (2).

14. A method of using a container according to claim 1 comprising the steps of:
(a) inserting the inner ring (4*b*) of the rotating base member (4) into the opened bottom end (1*b*) of the inner body (1); and
(b) elevating the stick product (7) by rotating the rotating base member relative to the cam sleeve (3) until the stick product is exposed.

* * * * *